United States Patent
Bhan et al.

(10) Patent No.: US 11,030,533 B2
(45) Date of Patent: Jun. 8, 2021

(54) METHOD AND SYSTEM FOR GENERATING A TRANSITORY SENTIMENT COMMUNITY

(71) Applicant: HIWAVE TECHNOLOGIES INC., Toronto (CA)

(72) Inventors: Vaibhav Bhan, Toronto (CA); Supriya Jyoti, Toronto (CA); Ravi Bhanabhai, Toronto (CA); Marjansadat Sayedzamani, Toronto (CA); Joe Lai, Toronto (CA)

(73) Assignee: HIWAVE TECHNOLOGIES INC., Toronto (CA)

( * ) Notice: Subject to any disclaimer, the term of this patent is extended or adjusted under 35 U.S.C. 154(b) by 275 days.

(21) Appl. No.: 16/216,038

(22) Filed: Dec. 11, 2018

(65) Prior Publication Data
US 2020/0184345 A1 Jun. 11, 2020

(51) Int. Cl.
| | | |
|---|---|---|
| *G06F 17/30* | (2006.01) | |
| *G06N 5/02* | (2006.01) | |
| *G06F 16/31* | (2019.01) | |
| *G06F 16/9536* | (2019.01) | |
| *G06F 16/35* | (2019.01) | |
| *G06F 40/30* | (2020.01) | |

(52) U.S. Cl.
CPC ............ *G06N 5/02* (2013.01); *G06F 16/313* (2019.01); *G06F 16/35* (2019.01); *G06F 16/9536* (2019.01); *G06F 40/30* (2020.01)

(58) Field of Classification Search
CPC ...... G06F 16/13; G06F 16/156; G06F 16/254; G06N 5/00; G06N 3/00; G06B 13/00
See application file for complete search history.

(56) References Cited

U.S. PATENT DOCUMENTS

| | | | |
|---|---|---|---|
| 7,398,271 B1 * | 7/2008 | Borkovsky | G06F 16/951 |
| 8,224,823 B1 * | 7/2012 | Amacker | G06F 16/9577 |
| | | | 707/736 |
| 8,396,855 B2 | 3/2013 | Aggarwal et al. | |
| 9,064,016 B2 * | 6/2015 | Shokouhi | G06F 16/9535 |
| 2006/0271564 A1 | 11/2006 | Meng Muntz et al. | |
| 2008/0244428 A1 * | 10/2008 | Fain | G06F 16/3328 |
| | | | 715/764 |
| 2010/0114946 A1 | 5/2010 | Kumar et al. | |
| 2010/0185935 A1 | 7/2010 | Yang et al. | |
| 2012/0016948 A1 | 1/2012 | Sinha | |

(Continued)

*Primary Examiner* — Hung D Le

(57) ABSTRACT

A method and system of generating a transitory sentiment community. The method comprises receiving data in a database memory of a server computing device, the data extracted from a plurality of data sources, pre-processing the data based on text character removal and text character replacement, to provide pre-processed data that includes keywords used in a descriptive manner, performing a sentiment analysis on the keywords based at least in part upon a training model, the sentiment analysis identifying a conformance to at least one of a set of sentiment classifications recognized by the training model, and a sentiment intensity rating associated with the conformance, modifying the sentiment intensity rating associated with the sentiment classification upon detecting a sarcasm sentiment above a sarcasm sentiment threshold, and generating the transitory sentiment community based at least in part on the sentiment classification and the modified sentiment intensity rating.

20 Claims, 5 Drawing Sheets

(56) References Cited

U.S. PATENT DOCUMENTS

| | | |
|---|---|---|
| 2012/0209919 A1 | 8/2012 | Shah et al. |
| 2014/0280621 A1 | 9/2014 | Bourdaillet et al. |
| 2015/0134402 A1 | 5/2015 | Barbieri et al. |
| 2016/0343368 A1* | 11/2016 | Yassa ................. G10L 13/0335 |
| 2017/0235792 A1* | 8/2017 | Mawji ................. G06F 16/9536 |
| | | 707/769 |
| 2019/0012599 A1* | 1/2019 | el Kaliouby ........... G06N 3/084 |
| 2019/0124023 A1* | 4/2019 | Conroy ................. G06N 20/20 |
| 2020/0133238 A1* | 4/2020 | Geiselhart ............... G06F 40/30 |

* cited by examiner

500

Receiving data, in a database memory associated with a server computing device, the data extracted from a plurality of data sources
510

↓

Pre-processing the data, in a processor of the server computing device, based on at least one of text character removal and text character replacement, to provide pre-processed data that includes a set of keywords used in a descriptive manner
520

↓

Performing a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance
530

↓

Modifying the sentiment intensity rating associated with the at least one sentiment classification upon detecting a sarcasm sentiment that is above a sarcasm sentiment likelihood threshold
540

↓

Generating the transitory sentiment community based at least in part on the at least one sentiment classification and the modified sentiment intensity rating
550

FIG. 5

METHOD AND SYSTEM FOR GENERATING A TRANSITORY SENTIMENT COMMUNITY

TECHNICAL FIELD

The disclosure herein relates to generating a transitory network community.

BACKGROUND

Current techniques associate social connections of a user that can be used effectively for purposes such as promoting products and services or for making personalized interactions in a system. Such approaches may lack a system that can collect and interpret necessary information without limitations based literal interpretations of the information as collected, while respecting privacy rights of individuals.

BRIEF DESCRIPTION OF THE DRAWINGS

FIG. 5 illustrates, in an example embodiment, a method of operation in generating a transitory sentiment community.

DETAILED DESCRIPTION

Figure 1:
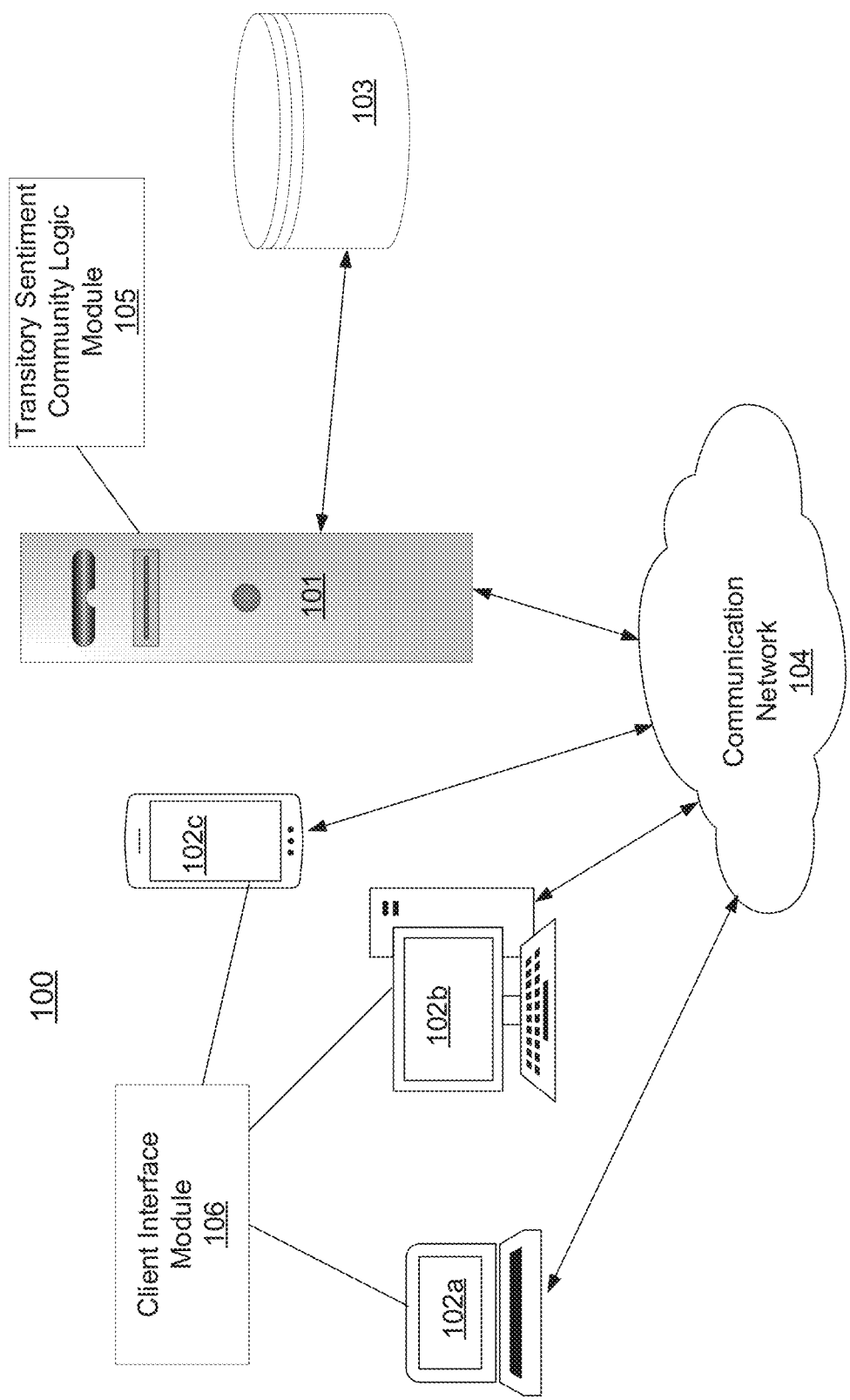
FIG. 1 illustrates, in an example embodiment, a server-based system for generating a transitory sentiment community.

Among other technical advantages and benefits, solutions provided herein provide a system that generates and captures a transitory sentiment community at a server computing device. The transitory nature of the sentiment community as generated ebbs and flows, being created or deleted in accordance with threshold sentiment parameters that define the creating or deleting of the transitory sentiment community. In some embodiments as suited for an ad hoc purpose, the transitory sentiment community may be based on collective sentiment or emotion inferred from posted content using a linguistic framework, allowing for real-time, fluid monitoring of such sentiment community in accordance with its transitory nature, while respecting individual privacy rights associated with content sources.

In accordance with a first example embodiment, a method of generating a transitory sentiment community. The method comprises receiving data, in a database memory associated with a server computing device, the data extracted from a plurality of data sources, pre-processing the data, in a processor of the server computing device based on at least one of text character removal and text character replacement, to provide pre-processed data that includes a set of keywords used in a descriptive manner, performing a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance, modifying the sentiment intensity rating associated with the at least one sentiment classification upon detecting a sarcasm sentiment that is above a sarcasm sentiment likelihood threshold, and generating the transitory sentiment community based at least in part on the at least one sentiment classification and the modified sentiment intensity rating.

In accordance with a second example embodiment, also provided is a server computing system for generating a transitory sentiment community. The server computing system comprises a processor and a memory storing a set of instructions. The instructions are executable in the processor to receive data, in a database memory associated with a server computing device, the data extracted from a plurality of data sources, pre-process the data, in a processor of the server computing device, based on at least one of text character removal and text character replacement, to provide pre-processed data that includes a set of keywords used in a descriptive manner, perform a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance, modify the sentiment intensity rating associated with the at least one sentiment classification upon detecting a sarcasm sentiment that is above a sarcasm sentiment likelihood threshold, and generate the transitory sentiment community based at least in part on the at least one sentiment classification and the modified sentiment intensity rating.

In accordance with a third example embodiment, a non-transitory memory medium storing instructions executable in a processor of a computing device is provided. The instructions are executable to receive data, in a database memory associated with a server computing device, the data extracted from a plurality of data sources, pre-process the data, in a processor of the server computing device, based on at least one of text character removal and text character replacement, to provide pre-processed data that includes a set of keywords used in a descriptive manner, perform a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance, modify the sentiment intensity rating associated with the at least one sentiment classification upon detecting a sarcasm sentiment that is above a sarcasm sentiment likelihood threshold, and generate the transitory sentiment community based at least in part on the at least one sentiment classification and the modified sentiment intensity rating.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device.

Furthermore, one or more embodiments described herein may be implemented through the use of logic instructions that are executable by one or more processors of a computing device, including a server computing device. These instructions may be carried on a computer-readable medium. In particular, machines shown with embodiments herein include processor(s) and various forms of memory for storing data and instructions. Examples of computer-readable mediums and computer storage mediums include portable memory storage units and flash memory (such as carried on smartphones). A server computing device as described herein utilizes processors, memory, and logic instructions stored in the memory or computer-readable medium. Embodiments described herein may be implemented in the form of computer processor-executable logic instructions or programs stored on computer-readable memory mediums.

System Description

FIG. 1 illustrates, in an example embodiment, transitory sentiment community logic module 105 hosted at server computing device 101, within cloud networked system 100 for software application execution with concurrent signaling. While server computing device 101 may include transitory sentiment community logic module 105 as depicted, it is contemplated that, in alternate embodiments, computing devices 102a-c, including desktop workstations, laptop computers, and mobile computing devices 102-c in communication via network 104 with server 101, may include one or more sub-modules or portions that constitute transitory sentiment community logic module 105 as embodied in computer processor-executable instructions stored within a non-transitory computer readable memory. Database 103 may be communicatively accessible to server computing device 101 (also referred to as server 101 herein) and also to one or more of client computing devices 102a-c (collectively referred to herein as client computing device 102) via communication network 104.

Client computing devices 102a-c may be configured to include client interface module 106 constituted of processor-executable instructions, allowing interaction by a user at client computing devices 102a-c with results generated from, or in conjunction with, transitory sentiment community logic module 105 at server 101. In one embodiment, client interface module 106 includes processor-executable instructions or a software application downloadable from server computing device 101 and configured to operate in conjunction with transitory sentiment community logic module 105 to allow physical user interface representations of the sentiment community at client computing device 102. It is contemplated that, in alternate embodiments, client interface module 106 may include one or more sub-modules or portions that constitute transitory sentiment community logic module 105 as embodied in computer processor-executable instructions stored within a non-transitory computer readable memory, and executable in a processor of client device 102.

Figure 2:
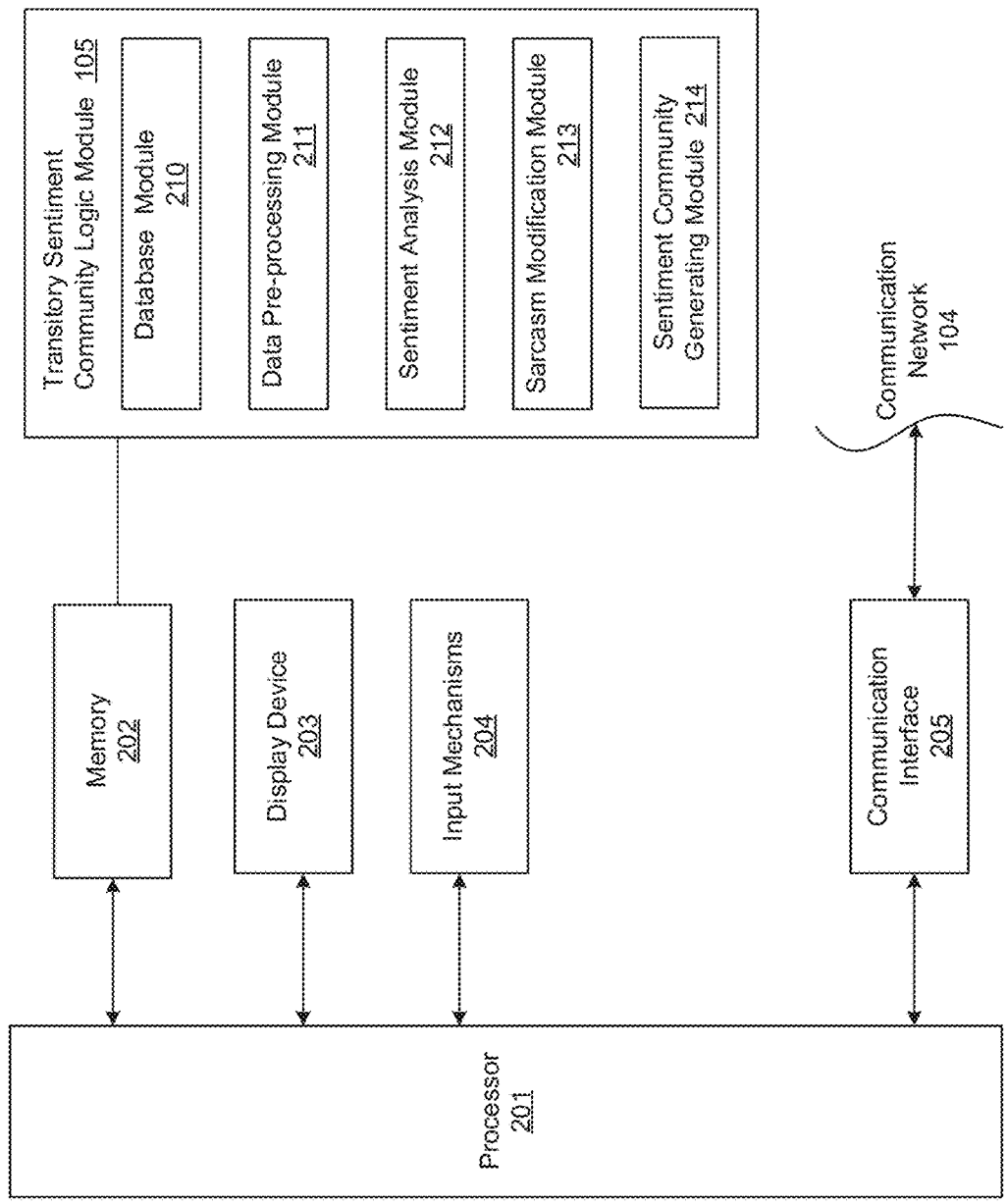
FIG. 2 illustrates, in one example embodiment, an architecture of a computing system for generating a transitory sentiment community.

FIG. 2 illustrates architecture 200 of server computing device 101 hosting transitory sentiment community logic module 105, in an example embodiment. Server computing device 101 may include processor 201, non-transitory computer readable memory 202 that includes transitory sentiment community logic module 105, display screen 203, input mechanisms 204 such as a keyboard or software-implemented touchscreen input functionality, and communication interface 207 for communicating with client devices 102a-c via communication network 104.

Transitory sentiment community logic module 105 includes instructions stored in memory 202 of server 101, the instructions configured to be executable in processor 201. Sentiment community logic module 105 may comprise portions or sub-modules including database module 210, data pre-processing module 211, sentiment analysis module 212, sarcasm modification module 213 and sentiment community generating module 214.

Database module 210, in an embodiment, includes instructions executable in processor 201 in association with database module 210 to receive data, in a database memory associated with server computing device 101, the data extracted from a plurality of data or content sources.

Data pre-processing module 211, in an embodiment, includes instructions executable in processor 201 to pre-process the extracted data or content, based on at least one of text character removal and text character replacement, to provide pre-processed data that includes a set of keywords used in a descriptive manner.

Sentiment analysis module 212, in an embodiment, includes instructions executable in processor 201 to perform a sentiment analysis on the set of keywords, based at least in part upon a training model, to: (i) identify a conformance to at least one sentiment classification of a set of sentiment classifications recognized by the training model, and (ii) derive a sentiment intensity rating associated with the conformance. In some example embodiments, sentiment classifications or labels may represent sentiments or emotions, in addition to a "sarcasm" or "sarcastic" sentiment or emotion, as any one or more of "anger", "disgust", "fear", "joy", "sadness", "surprise", "trust", "anticipation", "distrust", "satisfied", "dissatisfied", "disappointed", "delighted". It is contemplated that descriptions, classifications, labels and representations of sentiments or emotions may not be limited to only the latter examples, and furthermore, need not be limited to any particular form of, or conformance with, particular grammatical forms in accordance with tenses, verbs, nouns, or adjectives.

Sarcasm modification module 213, in one embodiment, includes instructions executable in processor 201 to modify the sentiment intensity rating associated with the at least one sentiment classification of the sentiment classifications recognized by a training model upon detecting a sarcasm sentiment that is above a sarcasm sentiment likelihood threshold. The sarcasm sentiment may be associated with a statistical likelihood that the set of keywords pertain to sarcasm based in art on the author of the underlying content. In one embodiment the sarcasm sentiment likelihood threshold may be expressed as a statistical confidence level threshold value, above which threshold value a sarcasm sentiment is established as detected.

Sentiment community generating module 214, in one embodiment, includes instructions executable in processor 201 to generate the transitory sentiment community based at least in part on the sentiment classification and the modified sentiment intensity rating in accordance with applying sarcasm sentiment module 213.

Figure 3:
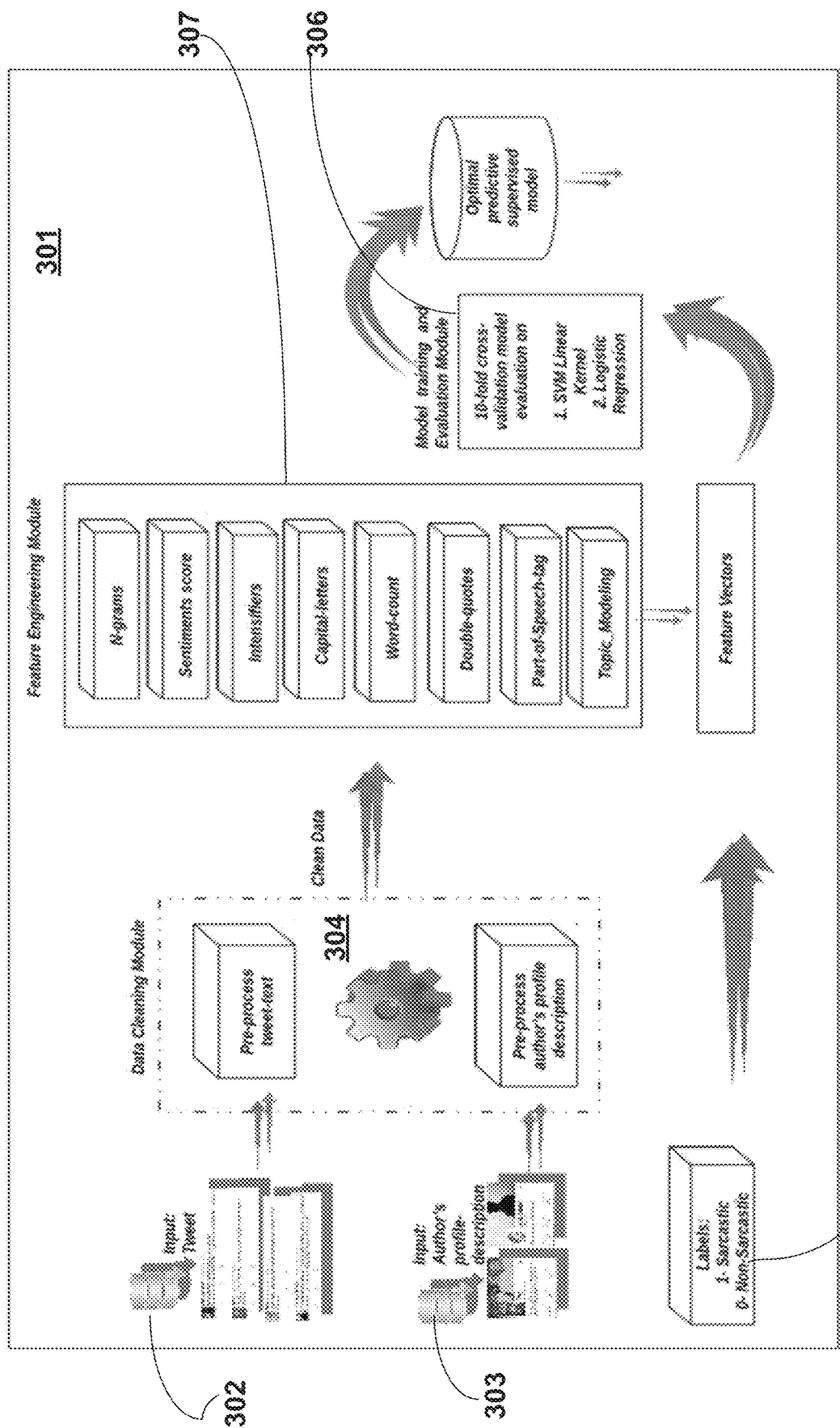
FIG. 3 illustrates, in an example embodiment, a linguistic framework including a sarcasm sentiment module.

FIG. 3 illustrates, in an example embodiment, linguistic framework 301 that includes author profile component 303, pre-processing component 304 which includes author profile pre-processing functions, and sarcasm identification component 305 of sarcasm sentiment module 213 for modifying a sentiment intensity rating associated with an identified sentiment class. The identified sentiment class may be one, or more than one in alternate embodiments, of a set of sentiment or emotion classifications recognized by training model 306.

Data source input component 302 provides input data to database module 210 to receive data in memory 202 or a database memory 103 associated with server computing device 101, the data being extracted from a plurality of data sources. The data sources comprise publicly available data such as, but not limited to, tweet content, instant messaging content, product review content, service review content, social media posting content, and website content.

Data gathered from content sources may be stored in an OrientDB open source NoSQL graph database in one embodiment, allowing flexibility, scalability, rapid scaling of data, providing advantages in query optimization, including use of lightweight edges and indexes that improves the speed of data retrieval. Data objects may be stored as nodes, with corresponding relationships represented as edges. Each node has unique properties depending on the source, but most nodes share common properties including user ID, create date, text, source, sentiment, category, and emotion parameters. Edges that connect the nodes show the relationship between nodes. Some edges have their own properties (regular edges) while others do not (lightweight edges).

General database optimization and tuning techniques may be applied to further improve database performance, such as indexing techniques applied to ensure advantageous balance between quick database access and disk space, with lightweight edges incorporated to improve performance and memory usage.

Feature engineering component 307 of linguistic framework 301 provides features and operations to be applied upon pre-processed, or cleaned, data of data cleaning module 304.

Figure 4:
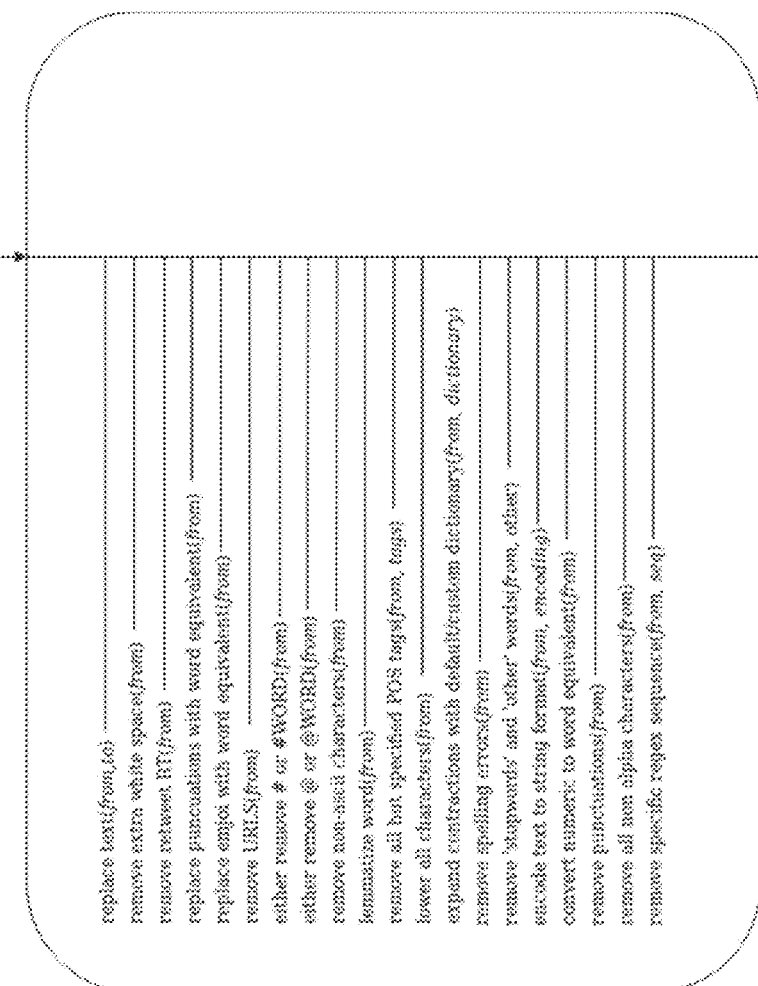
FIG. 4 illustrates an example embodiment of pre-processing data in generating a transitory sentiment community.

FIG. 4 illustrates an example embodiment 401 in exemplary detail related to pre-processing data in generating a transitory sentiment community, showing pre-processing operations performed on content, including text removal and text replacement operations.

In an embodiment that implements topic extraction operations, the a topic model based on dirilecht distributions and multinomial may be used to provide classification and general understanding of latent topics within the data content, such as a review of a product or service. In an embodiment, prior knowledge of topic-word distribution may be sued to provide an initialization to the starter distributions when selecting topic per word and to the data content item as well. This process of initializing the likelihood based on prior words may be incorporated into an online dirilecht-based technique. Creating the prior knowledge of topic-word distribution may be done manually for each use case to provide custom priors and allow for a guided latent Dirichlet allocation (LDA) approach which specializes in learning topics for a specific domain. To further improve and to be able to re-incorporate the priors we allow for constant reminder of prior information to stay within the model through the alpha and beta parameters of the LDA model. These two parameters in the online LDA algorithm allow the priors to maintain relevant throughout the inference and training processes. To calculate an optimal alpha beta contribution factor of regression analysis may be used to calculate alpha and beta parameters separated by combinations of prior knowledge and a set of coefficients.

Topic relevance ranking may be incorporated rank the words which describe each latent topic. An after-training analysis of the model and come with up relevancy and saliency scoring metrics. Adoption of these metrics allows for ranking of topic words, topic separation, and topic dominance. Attaching the new relevance metrics to online LDA with priors provide a unique and enhanced tool for topic analysis with quality measures. For topic optimization, topic modeling methods generate multinomial topic distribution in which each topic is a set of uni-gram tokens with a probability that determines how frequent each word appears in a text. In order to have more understandable topics, uni-gram tokens may be replaced with high quality phrases.

In one embodiment, a set of candidate labels may be extracted from the reference corpus. Then a relevancy score assigned to each candidate label. To score candidate labels, Kullback-Leibler divergence may be applied to find similarity between distribution of words in a topic and distribution of words in a label. Candidate labels may be ranked with respect to each topic model and top ranked labels selected to label the corresponding topic(s), a good label being denoted as having high semantic relevance to the target topic, and low semantic relevance to other topics.

Next in regard to topic related sentiment or emotion analysis, a pre-trained model 306 may be used to capture char embeddings is a new tactic in linguistic-based models. To further the model to high accuracies, a specialized set of keywords may identified and applied to gather training data for each of a set of emotions or sentiments. Using the list of keywords for each emotion training data may be extracted from content sources. The data was cleaned prior to training to ensure the keywords were used in a descriptive manner. Additionally, trained models may be incorporated to implement a full artificial intelligence (AI)-based teacher-student model. Such AI teachers may be implemented to select training data with high degree of confidence to be used to further train the emotion or sentiment model. To generate meaningful phrases as candidate labels from reference collection, chunking parser methods may be used to extract noun phrases. Labels which contain more important words (higher probability) in the topic distributions are considered as good labels. Multinomial distribution of topics found with online LDA (with setting priors as guided LDA) may be then matched with the top-ranked candidate labels which have high relevance score to each individual topic.

Next with regard to the particular sentiment of sarcasm, sentiment-based models may fail when sarcasm is involved in the input data content, for example, in tweets. Sarcasm detection can help in gaining a better insight into customer sentiments. As incorporated into sarcasm modification module model 213 for sarcasm sentiment detection and sentiment intensity modification, features may be analyzed from tweets and their description in order to capture the sarcasm expressed in tweets, for example. Further in reading to online content postings including tweets, registered authors on have the opportunity to provide a personal profile or self-description. Such self-description or author profile data may be used to extract information about personality traits of content authors, to enable or help in classifying sarcastic tweets from non-sarcastic ones with a high degree of accuracy. IN one example embodiment, a range of different feature-sets from tweet-text in conjunction with author's self-description may be engineer using LinearSVM and Logistic Regression predictive models. Further, lexical-based features 307 of linguistic framework 301 may be generated from review text such as n-grams, intensifiers, number of capital letter words, binary feature for double quotes, count of part-of-speech to name a few, as such features help in capturing the nuances of the writing style of a content author, such as Twitter users. Sentiment-based features may also be generated from the content. Positive, negative and difference in sentiment score, for example from different parts of the review text, are captured as features. This feature enables detection of a degree contrast of sentiment in a sarcasm. Topic-modeling based features may be captured from the user profile description by applying the topic modeling technique. Such feature is based on the presumption that the author's self-description can give a better idea of an inclination towards sarcasm.

In an embodiment, a slang related sentiment may be detected and applied to modify, such as by amplifying or attenuating, the sentiment intensity rating upon detecting existence of a slang component of the set of keywords. To find slang sentiments, one or more slang lexicons, such as Urban Dictionary which is a web-based dictionary of slang definitions, lists of popular idioms, and SlangSD lexicon which contains slangs and their associated sentiments. If a slang term or component exists in the lexicon, the slang sentiment is collected, including collecting reviews containing the slang with high relevance score and the slang examples containing the slang from the slang lexicon source. In social media, slangs may be commonly used in short forms, and informal terms. Hence, slang polarity may be identified before sentiment classification of reviews or blogs and other content. Thus, slangs or idioms may be detected in reviews and other content, and a sentiment score assigned to each slang term. Such results may be aggregated based on a highest ranking to produce a unique sentiment score for each slang. Since slangs usage and definition may change over time and in different data sources, the data collection of slangs may be updated continuously.

After preprocessing, steps applied to detect slangs in content may include a lookup table search in conjunction with the slang lexicon sources, then filtering out all non-slang words from text to find single-words slangs, such as by using WordNet and English words lexicons. Then, single words fond may be cross-referenced any existing definition in the slang lexicon source, upon which they are detected as slang, or otherwise simply a mis-spelling. Then upon slang detection, determining whether the slang appearing in the data content is consistent with its usage pattern in the lexicon source. In other words, if a slang in a review, for example, is consistent with its definition from Urban Dictionary as lexicon source. A relevancy score may be assigned to each content item containing the slang. In each content item that contains a slang, the slang is removed and compared to rest of the words in a text with the slang related words. This comparison is based on the semantic similarity between words in the content and words in the slang related words, for example, based on word2vec embeddings trained on Google News. If a word had a high semantic similarity to the related words, it may be added to a related words list. After comparing a review text with the slang related words, a list of floating numbers may be determined to represent a semantic distance between each pair of words. To assign the relevancy score to each data content item, the maximum semantic distance may be selected.

Methodology

FIG. 5 illustrates, in an example embodiment, method 500 of generating a transitory sentiment community, method 500 being performed by one or more processors 201 of server device 101. In describing the example of FIG. 5, reference is made to the examples of FIG. 1 through FIG. 4 for purposes of illustrating suitable components or elements in performing a step or sub-step being described.

Examples of method steps described herein relate to the use of server computing device 101 including transitory sentiment community logic module 105 for implementing the techniques described. According to one embodiment, the techniques are performed by server computing device 101 in response to the processor 201 executing one or more sequences of software logic instructions that constitute transitory sentiment community logic module 105. In embodiments, transitory sentiment community logic module 105 may include the one or more sequences of instructions within sub-modules including database module 210, data pre-processing module 211, sentiment analysis module 212, sarcasm modification module 213 and sentiment community generating module 214. Such instructions may be read into memory 202 from machine-readable medium, such as memory storage devices. In executing the sequences of instructions contained in database module 210, data pre-processing module 211, sentiment analysis module 212, sarcasm modification module 213 and sentiment community generating module 214 of transitory sentiment community logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

Additionally, it is further contemplated that in alternative embodiments, the techniques herein, or portions thereof, may be distributed between client, or subscriber, computing devices 102a-c and server computing device 101. For example, computing devices 102a-c may perform some portion of functionality described herein with regard to various modules of which transitory sentiment community logic module 105 is comprised, and transmit data to server 101 that, in turn, performs at least some portion of the techniques described herein.

At step 510, processor 201 executes instructions in association with database module 210 to receive data in memory 202 or a database memory 103 associated with server computing device 101, the data being extracted from a plurality of data sources.

In some embodiments, the data sources comprise publicly available data constituted of such as, but not limited to, tweet content, instant messaging content, product review content, service review content, social media posting content, and website content.

At step 520, processor 201 executes instructions of data pre-processing module 211 to pre-process the data, based on at least one of text character removal and text character replacement, to provide pre-processed data that includes a set of keywords used in a descriptive manner.

At step 530, processor 201 executes instructions of sentiment analysis module 212 to perform a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance to the at least one sentiment classification.

In an embodiment, the sentiment classification comprises a subset of the set of sentiment classifications as recognized by the training model.

In one variation, the method further includes identifying a plurality of topics based on the pre-processed data and selecting at least one topic based on a ranking of the plurality of topics.

A commonality or frequency of occurrence of some or all keywords forming the set may predominantly pertain to the selected topic in accordance with the ranking.

In another embodiment, the sarcasm sentiment is detected based at least in part on a personality trait of an author of the data from which the set of keywords is sourced or is traceable, and the pre-processing further comprises pre-processing data of the personality trait of the author, to detect a sarcasm sentiment likelihood factor. The sarcasm sentiment likelihood factor may be expressed, or quantified, as a statistical confidence level, in one embodiment.

At step 540, processor 201 executes instructions of sarcasm modification module 213 to modify the sentiment intensity rating associated with the at least one sentiment classification upon detecting a sarcasm sentiment parameter that is above a sarcasm sentiment likelihood threshold value.

In an embodiment, identifying the sentiment intensity rating includes determining a quantifiable statistical sentiment score associated with the sentiment classification, and the modifying includes either amplifying and attenuating the sentiment intensity rating of the sentiment classification.

The instructions of sarcasm modification module 213 may be further executable to modify or alter the sentiment classification to one or more alternate sentiment classifications recognized by the training model. In a further embodiment, altering the sentiment classification also includes replacing the sentiment classification with a generally contrary or opposite sentiment classification when sarcasm sentiment is detected above a certain threshold statistical confidence level. By way of illustration and examples, where the sentiment classification related to a product or services review as expressed is originally interpreted as "delighted", then a generally contrary or opposite sentiment classification applied in generating the sentiment community in lieu of "delighted" might be "disappointed"; where the sentiment classification as expressed is originally interpreted as "satisfied", then a generally contrary or opposite sentiment classification applied in generating the sentiment community in lieu of "satisfied" might be "dissatisfied"; where the sentiment classification as expressed is originally interpreted as "trust", a generally contrary or opposite sentiment classification applied in generating the sentiment community in lieu of "trust" might be "mistrust" or "distrust".

In an embodiment, the method further comprises modifying the sentiment intensity rating by either amplifying, or attenuating, the sentiment intensity rating upon detecting existence of a slang component of the set of keywords.

At step 550, processor 201 executes instructions of sentiment community generation module 214 to generate the transitory sentiment community based at least in part on the at least one sentiment classification and the modified sentiment intensity rating.

In one variation, generating the transitory sentiment community may be based on applying a sentiment intensity threshold to the modified sentiment intensity rating, whereupon the generating is initiated upon the sentiment intensity rating crossing above, or below in another embodiment, the modified sentiment intensity threshold.

In an embodiment, the sentiment classification comprises a subset of the set of sentiment classifications, and the method further comprises generating the transitory sentiment community based on a sentiment intensity threshold associated with respective ones of the subset of sentiment classifications.

In some variations, the transient sentiment community, including physical user interface representations thereof, may be generated by sentiment community generating module 114 in conjunction with client interface module 106 of client computing device 102 at a display interface or a user interface of client computing device 102.

It is contemplated that embodiments described herein extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments as described herein. Thus, the absence of describing combinations should not preclude the inventors from claiming rights to such combinations.

What is claimed is:

1. A method of generating a transitory sentiment community, the method comprising:
   receiving data, in a database memory associated with a server computing device, the data extracted from a plurality of data sources;
   providing, based on at least one of a text removal and a text character replacement operations performed on the data in a processor of the server computing device, a set of keywords usable in a descriptive manner;
   performing a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance;
   modifying the sentiment intensity rating associated with the at least one sentiment classification upon detecting a sarcasm sentiment that is above a sarcasm sentiment likelihood threshold; and
   generating the transitory sentiment community based at least in part on the at least one sentiment classification and the modified sentiment intensity rating.

2. The method of claim 1 further comprising:
   identifying a plurality of topics based on the set of keywords; and
   selecting at least one topic based on a ranking of the plurality of topics;
   wherein the set of keywords predominantly pertain to the at least one topic.

3. The method of claim 1 wherein the data sources comprise publicly available data constituted of at least one of tweet content, product review content, service review content, social media posting content, and website content.

4. The method of claim 1 wherein the modifying comprises one of amplifying and attenuating the sentiment intensity rating of the at least one sentiment classification.

5. The method of claim 1 wherein the generating is based on applying a sentiment intensity threshold to the modified sentiment intensity rating, and the sentiment intensity rating is one of above and below the sentiment intensity threshold.

6. The method of claim 1 wherein the least one sentiment classification comprises a subset of the set of sentiment classifications, and further comprising generating the transitory sentiment community based on a sentiment intensity threshold associated with respective ones of the subset of sentiment classifications.

7. The method of claim 1 wherein the sarcasm sentiment is detected based at least in part on a personality trait of an author of the data from which the set of keywords is provided.

8. The method of claim 1 further comprising modifying the at least one sentiment classification to one or more alternate sentiment classifications recognized by the training model.

9. The method of claim 1 wherein identifying the sentiment intensity rating includes determining a statistical sentiment score for the at least one sentiment classification.

10. The method of claim 1 further comprising modifying the sentiment intensity rating by one of amplifying and attenuating the sentiment intensity rating upon detecting existence of a slang component of the set of keywords.

11. A server computing system for generating a transitory sentiment community, the server computing system comprising:
a processor;
a memory storing a set of instructions, the instructions executable in the processor to:
receive data, in a database memory associated with a server computing device, the data extracted from a plurality of data sources;
provide, based on at least in part upon one of a text character removal and a text character replacement operations performed on the data in a processor of the server computing device, set of keywords usable in a descriptive manner;
perform a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance;
modify the sentiment intensity rating associated with the at least one sentiment classification upon detecting a sarcasm sentiment that is above a sarcasm sentiment likelihood threshold; and
generate the transitory sentiment community based at least in part on the at least one sentiment classification and the modified sentiment intensity rating.

12. The server computing system of claim 11 further comprising instructions executable in the processor to:
identify a plurality of topics based on the set of keywords; and
select at least one topic based on a ranking of the plurality of topics;
wherein the set of keywords predominantly pertain to the at least one topic.

13. The server computing system of claim 11 wherein the data sources comprise publicly available data constituted of at least one of tweet content, product review content, service review content, social media posting content, and website content.

14. The server computing system of claim 11 wherein the modifying comprises one of amplifying and attenuating the sentiment intensity rating of the at least one sentiment classification.

15. The server computing system of claim 11 wherein the generating is based on applying a sentiment intensity threshold to the modified sentiment intensity rating, and the sentiment intensity rating is one of above and below the sentiment intensity threshold.

16. The server computing system of claim 11 wherein the least one sentiment classification comprises a subset of the set of sentiment classifications, and further comprising generating the transitory sentiment community based on a sentiment intensity threshold associated with respective ones of the subset of sentiment classifications.

17. The server computing system of claim 11 wherein the sarcasm sentiment is detected based at least in part on a personality trait of an author of the data from which the set of keywords is provided.

18. The server computing system of claim 11 further comprising instructions executable in the processor to modify the at least one sentiment classification to one or more alternate sentiment classifications recognized by the training model.

19. The server computing system of claim 11 wherein identifying the sentiment intensity rating includes determining a statistical sentiment score for the at least one sentiment classification.

20. The server computing system of claim 11 further comprising instructions executable in the processor to modify the sentiment intensity rating by one of amplifying and attenuating the sentiment intensity rating upon detecting existence of a slang component of the set of keywords.

* * * * *